United States Patent [19]

May et al.

[11] Patent Number: 5,615,024
[45] Date of Patent: Mar. 25, 1997

[54] COLOR DISPLAY DEVICE WITH CHIRPED DIFFRACTION GRATINGS

[75] Inventors: Paul May; Graham J. Woodgate; David Ezra, all of Oxon, United Kingdom

[73] Assignee: Sharp Kabushiki Kaisha, Osaka, Japan

[21] Appl. No.: 105,018

[22] Filed: Aug. 10, 1993

[30] Foreign Application Priority Data

Aug. 11, 1992 [GB] United Kingdom ............... 9216951

[51] Int. Cl.$^6$ .................................................. G02F 1/1335
[52] U.S. Cl. ........................... 349/57; 359/19; 359/575; 359/571; 349/95; 349/158
[58] Field of Search .................. 359/40, 15, 41, 359/19, 48, 575, 565, 566, 569, 571; 345/32

[56] References Cited

U.S. PATENT DOCUMENTS

| | | | |
|---|---|---|---|
| 3,578,845 | 5/1971 | Brooks | 359/569 |
| 4,021,267 | 5/1977 | Dettling | 136/89 PC |
| 4,079,411 | 3/1978 | Engelbrecht et al. | 358/6 |
| 4,204,881 | 5/1980 | McGrew | 359/571 |
| 4,389,096 | 6/1983 | Hori et al. | 359/41 |
| 4,798,448 | 1/1989 | van Rattle | 359/54 |
| 4,807,978 | 2/1989 | Grinberg et al. | 350/3.73 |
| 4,917,465 | 4/1990 | Conner et al. | 359/53 |
| 5,082,629 | 1/1992 | Burgess, Jr. et al. | 385/12 |
| 5,264,880 | 11/1993 | Sprague et al. | 353/31 |
| 5,272,551 | 12/1993 | Lehureau et al. | 359/19 |
| 5,420,718 | 5/1995 | Davies et al. | 359/615 |

FOREIGN PATENT DOCUMENTS

| | | |
|---|---|---|
| 62-293222 | 12/1987 | Japan . |
| 6-230384 | 8/1994 | Japan ............................... 359/40 |
| 2152724 | 8/1985 | United Kingdom . |
| 2260203 | 4/1993 | United Kingdom . |

OTHER PUBLICATIONS

Yao et al "Chirp-Grating lens for guided-wave optics" Appl. Phys. Letter 33(7)–Oct. 1978 –pp. 635–637.
Search Report for European Appl. 93306299.4, mailed Nov. 18, 1993.
Brady et al, "Liquid Crystal Color Display", IBM Tech. Bul., vol. 24, No. 3, Aug. 1981, pp. 1573–1576.

Primary Examiner—William L. Sikes
Assistant Examiner—Tai V. Duong

[57] ABSTRACT

A display device comprises a liquid crystal spatial light modulator (1) associated with diffractive means, such as a diffraction grating comprising grating elements (5). The diffraction grating is illuminated by a light source (6, 7) and each element is chirped and blazed so as to separate the primary colors of the illuminating light and direct them to individual light-modulating elements (R, G, B) of the modulator (1). By dispensing with conventional color filters, the efficiency of the display device is improved. Further, the focusing action of the grating elements (5) directs light to the elements of the modulator (1) so as to prevent light wastage caused by blocking of light by opaque regions of the display.

18 Claims, 2 Drawing Sheets

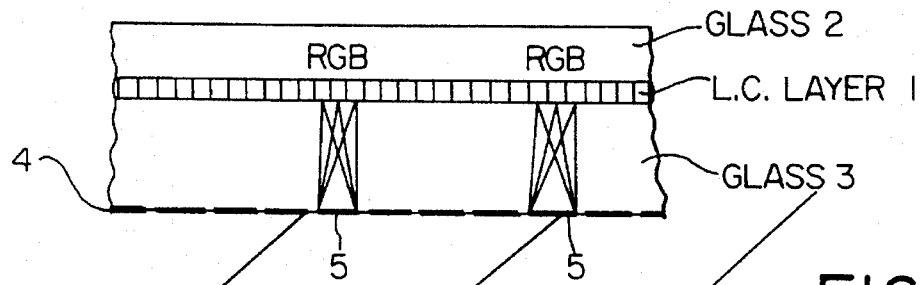
FIG. 1
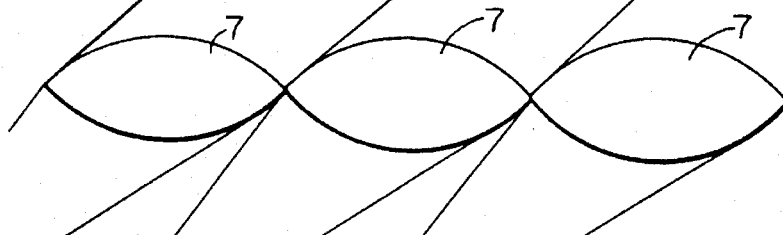
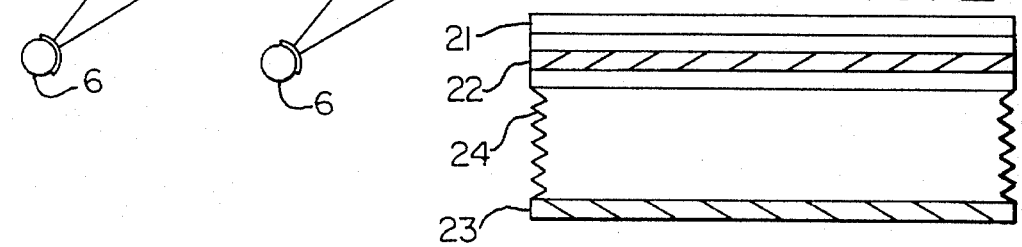
FIG. 2
FIG. 3
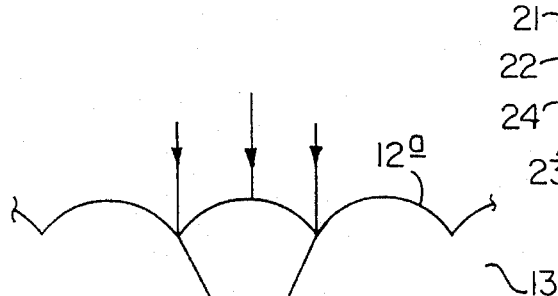
FIG. 4
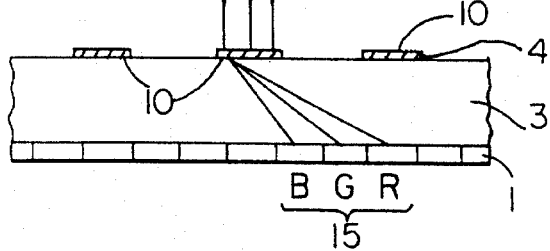

COLOR DISPLAY DEVICE WITH CHIRPED DIFFRACTION GRATINGS

The present invention relates to a colour display device, for instance in the form of a diffractive element integrated with a liquid crystal device, and to a display device utilising a diffractive element for focusing.

In known flat panel liquid crystal displays, back lights such as elongate fluorescent lights are used in combination with a spatial light modulator in the form of a liquid crystal device and red, green, and blue colour filters. In the type of display comprising a plurality of picture elements (pixels), the pixels are arranged in groups of three together with red, green, and blue light filters in order to provide a colour display. Such displays are used, for instance, as "lap-top" computer displays and in other portable equipment.

Displays of this type have a number of disadvantages. Firstly, because colour filters are used to define the red, green, and blue elements with polychromatic or white light back-illumination, approximately two thirds of the light is absorbed by the colour filters, which makes the displays rather inefficient. For portable equipment powered by batteries, this poor efficiency leads either to reduced battery life or to the need for larger batteries for a given level of light output from the display.

Further, the manufacturing process of such displays is relatively complicated. For a full colour display, three sets of colour filters have to be provided and each colour filter requires at least one lithography step during manufacture. Thus, cost and complexity of manufacture are relatively high.

GB 2 152 724 discloses a multicolour picture display device in which the colour filters are replaced by prisms for dividing incident polychromatic light into its colour components. Red, green, and blue pixels of a liquid crystal display modulate the appropriate colour components from the prisms. Although such a display allows improved efficiency of light utilisation to be achieved, the use of refractive elements in the form of the prisms increases the cost and difficulty of manufacture of such a display.

In liquid crystal displays in which the pixels do not occupy the whole of the surface of the display, the light from the back-illumination is further wasted as the regions between the pixels merely block light and prevent its use for illuminating the display. For instance, liquid crystal devices are frequently formed with integral electronics which are opaque to light. Such blocking or shadowing of the back-illumination further reduces efficiency of utilisation of light.

According to a first aspect of the invention, there is provided a colour display device comprising a spatial light modulator having at least one first region for modulating light of a first colour and at least one second region for modulating light of a second colour, and diffractive means for receiving polychromatic light and for directing light of the first colour to the or each first region and light of the second colour to the or each second region.

By utilising diffractive means to split polychromatic light into two or more colours, it is possible to dispense with the conventional colour filters so that the available light from back-illumination can be utilised more efficiently. Diffractive means with relatively high efficiencies thus allow smaller batteries for powering back-illumination to be used and/or allow increased battery life to be achieved. Further, the diffractive means may provide focusing of the light through the light-modulating regions so that little or no light is wasted by being obscured by opaque regions between the light-modulating regions.

The use of diffractive means reduces the cost and complexity of manufacture of displays compared both with known displays using colour filters and with known displays using prisms. Thus, relatively high efficiencies combined with reduced cost can be achieved.

The spatial light modulator preferably has at least one third region for modulating light of a third colour and the diffractive means preferably directs light of the third colour to the or each third region. The first, second, and third colours are preferably red, green, and blue and the light-modulating regions may comprise pixels so as to provide a two-dimensional substantially full colour display device.

The light-modulating regions of the spatial light modulator may be arranged in groups of red, green, and blue elements and the diffractive means may comprise a plurality of elements, each of which directs light of the three colours to the three regions of a respective group. Thus, the groups and the elements of the diffractive means may be arranged as a repeating one or two dimensional pattern to provide a desired display format.

The diffractive means may comprise a diffraction grating, for instance in the form of a plurality of identical diffraction grating elements each of which comprises an individual chirped grating. In order to maximise the utilisation of light, the grating elements are preferably blazed, for instance so as to maximise light output in the first order of the grating and to minimise light output for other grating orders. For illumination by a collimated beam with a non-zero angle of incidence on the grating, the grating elements may be arranged contiguously. Alternatively, light which is incident normally on the grating elements may be used with the elements spaced apart. In order to maximise utilisation of light, a microlens telescope arrangement may be provided so as to concentrate the light on to the spaced grating elements. In another embodiment, the diffractive means may comprise a hologram for separating the light components and directing them towards the respective regions of the spatial light modulator.

Preferably, the diffractive means are formed integrally with the spatial light modulator, for instance on a transparent back surface thereof. The spatial light modulator may comprise a liquid crystal device comprising glass or transparent plastics with the diffractive means formed on the back surface by stamping, moulding, or in any other suitable way.

According to a second aspect of the invention, there is provided a display device comprising a spatial light modulator having at least one region for modulating light, and diffractive means for focusing light towards the or each region.

It is thus possible to make use of the focusing properties, with or without the colour separating properties, of the diffractive means in order to focus light onto the light-modulating regions so as to prevent opaque regions between the modulating regions from blocking light and reducing the efficiency of utilisation of back-illumination.

The present invention will further be described, by way of example, with reference to the accompanying drawings, in which:

FIG. 1 is a schematic diagram of a colour display device constituting a first embodiment of the present invention;

FIGS. 2 and 3 are schematic diagrams of a colour display device constituting a second embodiment of the present invention;

FIG. 4 is a schematic diagram of a colour display device including a microlens array and constituting a third embodiment of the present invention.

Figure 5:
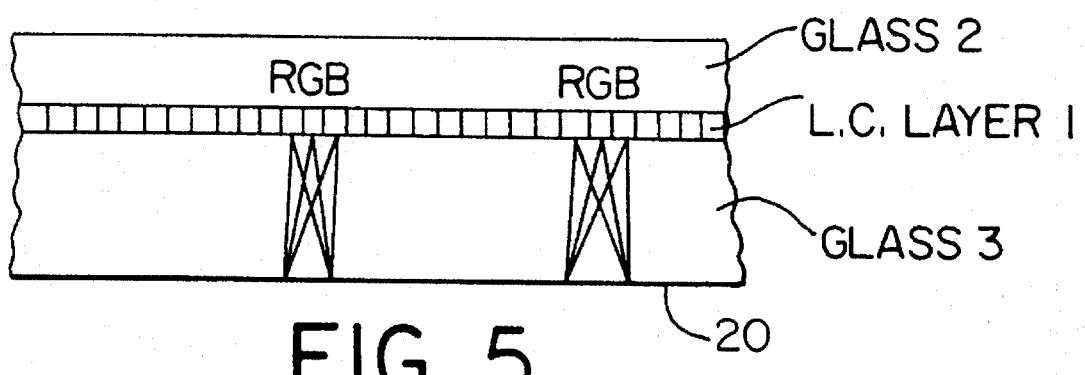
FIG. 5 is a schematic diagram of a colour display device constituting a fourth embodiment of the present invention.

FIG. 1 shows a colour display in the form of a diffractive element integrated with a liquid crystal device. The liquid crystal device comprises a liquid crystal layer 1 which is pixelated into groups of pixels, each group comprising three pixels allocated for modulating the intensity of red, green, and blue light passing therethrough. The liquid crystal layer 1 is sandwiched between a front glass layer 2 and a rear glass layer 3. The back surface of the glass layer 3 has a diffraction grating 4 formed thereon by any suitable manufacturing technique.

The diffraction grating comprises a plurality of identical grating elements, each of which corresponds to a respective set of red (P,), green (G), and blue (B) pixels of the liquid crystal layer 1. Two such elements are indicated at 5 together with red, green, and blue ray paths within the glass layer 3.

The back-illumination for the display device comprises a plurality of thin elongate fluorescent light sources 6 of relatively small aperture. The light sources are arranged to provide collimated beams of light directed at approximately 45° to the normal to the grating 4. Each of the light sources 6 is located in the focal plane of a corresponding cylindrical converging lens 7 so that the light from the light source is formed into a collimated beam which is incident on the grating 4 at an angle of approximately 45°. Thus, each light source is laterally offset from the optical axis of its associated lens by an amount substantially equal to the focal length of the lens. The numerical apertures of the light sources 6 and the lenses 7 are matched so as to maximise the utilisation of light from the light sources.

In order for light separation by the diffraction grating 4 through the red, green, and blue picture elements of the liquid crystal layer 1 to be efficient, the divergence from parallel of light rays within the collimated beams produced by the lenses 7 must be held within certain limits. It is desirable for light rays to be incident on the diffraction grating 4 at an angle which varies by no more than plus or minus 2° from 45°, which is well within practical limits.

Typically, the lenses 7 may be spaced from the sources 6 by approximately 6 cm. To improve portability, means may be provided for collapsing the display when not in use so as to reduce its bulk. Such means may, for instance, comprise a mechanical concertina mechanism as described hereinafter. In a typical application of such an arrangement, the position of the sources with respect to the lenses is not critical and such a mechanism would not therefore need to be highly sophisticated and expensive.

In order for each diffraction grating element 5 to separate the primary colours directed to the red, green, and blue pixels of the liquid crystal layer 1, the elements 5, which are identical to each other, each comprise a diffraction grating which is chirped i.e. the grating pitch varies across the grating. The size of the pixels, the thickness of the glass layer 3, and the angle of incidence of light on the grating 4 determine the pitch and the degree of chirping which is necessary in order to provide efficient colour separation. Efficient colour separation may be achieved with practical embodiments of the device illustrated in FIG. 1. For instance, for a pixel size of 250 microns and a thickness of 4.2 mm. for the glass layer 3, each diffraction grating element 5 has a pitch of about 1.2 microns at its left end in FIG. 1 and about 0.85 microns at its right end.

In order to maximise efficiency, the grating elements 5 are blazed so as to maximise light output in the first order while minimising light output in other orders, such as the zeroth order and the −1th order. Blazing techniques for achieving this are well known.

In addition to the colour separation, the diffraction grating 4 also provides a degree of focusing of light towards the red, green, and blue pixels. Such focusing allows light to be concentrated through the pixels and reduces the amount of light directed onto opaque regions between pixels, for instance regions carrying control electronics associated with the pixels.

FIGS. 2 and 3 show a display device which may be collapsed when not in use. FIG. 2 illustrates the device in operation whereas FIG. 3 shows the device when collapsed, for instance for storage or transport.

The device comprises a layer 21 comprising display elements and a diffractive means, for instance of the type shown as elements 1 to 5 in FIG. 1. The layer 21 is fixedly spaced from a focussing layer 22 for illuminating the layer 21 with collimated light. A light array 23 is fixed to the layer 22 by means of a concertina mechanism 24. The light array may, for instance, comprise light sources of the type shown at 6 in FIG. 1.

The concertina mechanism 24 allows the device to be collapsed, as shown in FIG. 3, when not in use so that its thickness is substantially reduced. In this state, the light array 23 is relatively close to layer 22. When the device is to be used, the concertina mechanism 24 is extended as shown in FIG. 2, for instance so that the light sources of the array 23 lie substantially in the focal plane of the lenses of a microlens array forming the layer 22.

In an alternative embodiment, as shown in FIG. 4, normal or near normal illumination of a diffraction grating 4 may be used. A pixelated liquid crystal device similar to that described for the first embodiment is used and like reference numerals refer to like parts. The diffraction grating 4 comprises a plurality of individual diffraction gratings 10 which are spaced apart. Each grating 10 difffacts and directs light from an associated pair of microlenses 12a and 12b of a microlens array 13 to an associated group of pixels 15 within the liquid crystal layer 1. The gratings 10 are blazed so as to maximise the light output in the first order whilst minimising the light output in other orders, such as the zeroth order, the −1th order and the higher orders. The microlens array 13 comprises a plurality of cylindrical lenses 12a and 12b. Each lens 12b is symmetrically disposed with respect to its respective lens 12a. The action of the microlens array 13 is to collect light incident on a first surface carrying the lenses 12a and to focus the light onto the gratings 10, thereby increasing the intensity of the light incident on the grating 10 compared to the light intensity incident thereon in the absence of the microlens array. A practical embodiment of the microlens array, for use with a display having a pixel size of 250 microns arranged in groups of 3, each group being 750 microns wide, has lenses 12a 0.75 millimeters wide with focal lengths of 1.5 millimeters and lenses 12b 0.25 millimeters wide with focal lengths of 0.5 millimeters.

FIG. 5 shows a further embodiment in which a hologram 20 is provided for separating light incident upon the hologram into red, green and blue components and directing them towards the respective regions of the liquid crystal layer. The use of a hologram allows greater choice in the positioning of the light sources with respect to the liquid crystal device, a long as the hologram is recorded for the actual arrangement of light sources and liquid crystal device used.

As mentioned above, colour filters achieve an efficiency of light utilisation of approximately 30%. In the present displays, the light utilisation efficiency as compared with known displays depends largely on the efficiency of the diffraction grating 4. This in turn depends largely on the efficiency of blazing so as to concentrate light output, for instance, in the first grating mode. Blazed gratings with efficiencies greater than or equal to 50% are practically achievable. Further, the focusing effect of the grating permits further improvements in efficiency to be achieved. Thus, efficiencies which are twice those of known colour filtering displays are achievable in practice and without requiring any complex or expensive manufacturing techniques. Indeed, manufacture of the present colour display is simpler and cheaper than for known displays as the multiple lithography steps for forming the colour filters of the known displays are avoided and relatively simple manufacturing steps for forming the diffraction grating 4 may be employed. Thus, reduced cost and complexity of manufacture can be combined with approximately doubling the battery life, or halving the battery capacity required for a given life, to achieve a predetermined display brightness. The present displays therefore provide substantial advantages, for instance in the field of flat screen colour displays for portable equipment.

Various modifications may be made within the scope of the invention. For instance, the light sources 6 and the lenses 7 may be replaced by light sources and lenses directing collimated light normally towards the grating elements 5 but via a binary optical grating acting as a fresnel wedge so as to angle the collimated light onto the grating elements 5. Also, in all of the embodiments shown in the drawings, a diffuser may be provided on the front surface of the front glass layer 2.

What is claimed is:

1. A display device comprising:
    a spatial light modulator having a plurality of groups of regions for modulating light, and
    a diffraction grating comprising a plurality of substantially identical chirped gratings, each of the chirped gratings being operative to focus light of different colors toward different respective regions in a corresponding one of the groups of regions.

2. A color display device comprising:
    a spatial light modulator having a plurality of groups of regions each having at least one first region for modulating light of a first color and at least one second region for modulating light of a second color, and
    a diffraction grating for receiving polychromatic light and for directing light of the first color to said first regions and light of the second color to said second regions, wherein said diffraction grating comprises a plurality of substantially identical grating elements, each of which comprises a chirped grating and operatively corresponds to a respective one of the groups.

3. A color display device according to claim 2, in which each group in the spatial light modulator has at least one third region for modulating light of a third color, and the diffraction grating directs light of the third color to said third region.

4. A color display device according to claim 3, in which the first, second and third colors are primary colors and the light-modulating region comprise pixels.

5. A color display device according to claim 4, in which the light-modulating regions of the spatial light modulator are arranged in groups of red, green, and blue elements and each grating element of the diffraction grating directs light of the three colors to the three regions of a respective group.

6. A color display device according to claim 5, in which the groups and the elements of the diffraction grating are arranged as a repeating one-dimensional pattern.

7. A color display device according to claim 5, in which the groups and the elements of the diffraction grating are arranged as a repeating two-dimensional pattern.

8. A color display device according to claim 2, in which the grating elements are blazed so as to maximize light output in a predetermined order of the grating.

9. A color display device according to claim 8, in which the grating elements are blazed so as to maximize light output in the first order of the grating.

10. A color display device according to claim 2, in which the color display device further comprises an illuminating means for supplying a collimated beam with a non-zero angle of incidence on the diffraction grating, and wherein the grating elements are arranged contiguously.

11. A color display device according to claim 2, in which the grating elements are spaced apart, and the color display device further comprises a means for providing normal illumination of the grating elements.

12. A color display device according to claim 11, in which the color display device further comprises a microlens telescope arrangement for concentrating light onto the spaced grating elements.

13. A color display device according to claim 2, in which the diffraction grating is formed integrally with the spatial light modulator.

14. A color display device according to claim 13, in which the spatial light modulator comprises a liquid crystal device.

15. A color display device according to claim 14, in which the diffraction grating is formed on a surface of the liquid crystal device.

16. A color display device according to claim 2, in which the color display device further comprises at least one light source attached with respect to the diffraction grating by a collapsible attachment.

17. A color display device according to claim 2, wherein each of the chirped gratings separates the polychromatic light into the first color and the second color and focusses the first and second colors respectively on the first and second regions.

18. A color display device according to claim 3, wherein each of the chirped gratings separates the polychromatic light into the first color, the second color, and the third color, and focusses the first, second, and third colors respectively on the first, second, and third regions.

* * * * *